(12) United States Patent
Huang

(10) Patent No.: US 11,661,378 B2
(45) Date of Patent: May 30, 2023

(54) BORON NITRIDE AGGLOMERATE, THERMOSETTING RESIN COMPOSITION CONTAINING SAME, AND USE THEREOF

(71) Applicant: Shengyi Technology Co., Ltd., Guangdong (CN)

(72) Inventor: Zengbiao Huang, Guangdong (CN)

(73) Assignee: Shengyi Technology Co., Ltd., Guangdong (CN)

(*) Notice: Subject to any disclaimer, the term of this patent is extended or adjusted under 35 U.S.C. 154(b) by 257 days.

(21) Appl. No.: 16/770,004

(22) PCT Filed: Mar. 23, 2018

(86) PCT No.: PCT/CN2018/080166
§ 371 (c)(1),
(2) Date: Jun. 4, 2020

(87) PCT Pub. No.: WO2019/127943
PCT Pub. Date: Jul. 4, 2019

(65) Prior Publication Data
US 2021/0221743 A1    Jul. 22, 2021

(30) Foreign Application Priority Data
Dec. 29, 2017 (CN) .......................... 201711471842.5

(51) Int. Cl.
*C04B 35/583* (2006.01)
*C08K 5/14* (2006.01)
(Continued)

(52) U.S. Cl.
CPC .......... *C04B 35/583* (2013.01); *C01B 21/064* (2013.01); *C04B 35/6316* (2013.01);
(Continued)

(58) Field of Classification Search
CPC ........................... C04B 35/583; C01B 21/064
See application file for complete search history.

(56) References Cited

U.S. PATENT DOCUMENTS
2015/0137026 A1    5/2015  Engler et al.

FOREIGN PATENT DOCUMENTS
CN    102197069 A    9/2011
CN    103249695 A    8/2013
(Continued)

OTHER PUBLICATIONS
Machine translation CN 103059567 A (Year: 2015).*
(Continued)

*Primary Examiner* — Alexandre F Ferre
(74) *Attorney, Agent, or Firm* — Norton Rose Fulbright US LLP; James R. Crawford (57) ABSTRACT

Provided is a boron nitride agglomerate. The boron nitride agglomerate is of a multi-stage structure formed by arranging flaky hexagonal boron nitride primary particles in three-dimensional directions through adhesion of an inorganic binder. Further provided is a method for preparing the boron nitride agglomerate. The method comprises: mixing flaky hexagonal boron nitride primary particles with an inorganic binder, and controlling the mass of the inorganic binder to account for 0.02-20% of the mass of the flaky hexagonal boron nitride primary particles, so as to obtain the boron nitride agglomerate. The boron nitride agglomerate provided can be added to thermosetting resin compositions, and resin sheets, resin composite metal foil, prepregs, laminates, metal (Continued)

foil-covered laminates, and printed wiring boards prepared using the same have higher boron nitride addition, high thermal conductivity, and high peel strength.

19 Claims, 2 Drawing Sheets

(51) Int. Cl.

| | |
|---|---|
| *C08L 53/02* | (2006.01) |
| *C08K 5/03* | (2006.01) |
| *C08K 3/36* | (2006.01) |
| *C04B 35/63* | (2006.01) |
| *C08K 5/00* | (2006.01) |
| *C08J 5/24* | (2006.01) |
| *C01B 21/064* | (2006.01) |
| *C08K 3/38* | (2006.01) |

(52) U.S. Cl.
CPC ............... *C08J 5/24* (2013.01); *C08K 3/36* (2013.01); *C08K 5/0025* (2013.01); *C08K 5/0066* (2013.01); *C08K 5/03* (2013.01); *C08K 5/14* (2013.01); *C08L 53/02* (2013.01); *C01P 2004/30* (2013.01); *C01P 2004/50* (2013.01); *C01P 2004/61* (2013.01); *C01P 2004/62* (2013.01); *C08K 2003/385* (2013.01)

(56) References Cited

FOREIGN PATENT DOCUMENTS

| | | |
|---|---|---|
| CN | 104284860 A | 1/2015 |
| CN | 103059567 B * | 4/2015 |
| CN | 104479291 A | 4/2015 |
| CN | 105308111 A | 2/2016 |
| CN | 105579511 A | 5/2016 |
| CN | 106255721 A | 12/2016 |
| EP | 3375822 A1 | 9/2018 |
| JP | 2017057098 A | 3/2017 |
| KR | 20140110439 A | 9/2014 |
| TW | 201536715 A | 10/2015 |
| WO | 2017038512 A1 | 3/2017 |

OTHER PUBLICATIONS

Office Action dated Jan. 14, 2021 by the CIPO in the corresponding Patent Application No. 201711471842.5, with English translation.
European Search Report dated Aug. 8, 2021 in corresponding Patent Application No. 18896498.5-1103.

\* cited by examiner

BORON NITRIDE AGGLOMERATE, THERMOSETTING RESIN COMPOSITION CONTAINING SAME, AND USE THEREOF

CROSS REFERENCE TO RELATED APPLICATIONS

This patent application is a national phase under 35 U.S.C. § 371 of International Patent Application No. PCT/CN2018/080166 filed Mar. 23, 2018, which claims the benefit of priority from Chinese Patent Application No. 201711471842.5, filed Dec. 29, 2017, each of which is hereby incorporated herein by reference in its entirety for all purposes.

TECHNICAL FIELD

The present invention belongs to the technical field of polymers, and particularly relates to a boron nitride agglomerate, a thermosetting resin composition comprising the same, and uses thereof.

BACKGROUND

Figure 1:
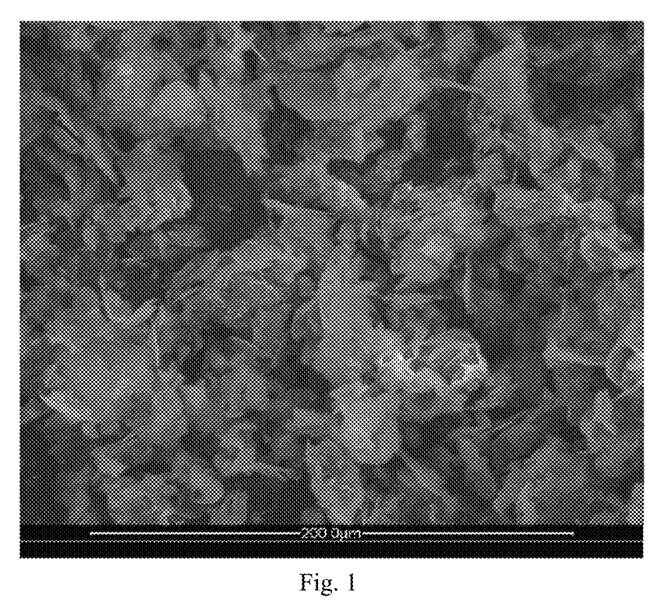
FIG. 1 shows the basic structure of a general flake-shaped boron nitride in the prior art.

In order to obtain higher material thermal conductivity, boron nitride and alumina fillers with higher thermal conductivity have been gradually used in recent years, to make it possible to obtain higher thermal conductivity for resin compositions or composite materials to further improve the heat dissipation capacity of the materials. The basic structure of a general flake-shaped boron nitride is shown in FIG. 1. However, the general flake-shaped boron nitride is easily agglomerated and difficult to disperse when added into a resin composition. Moreover, it will reduce the peel strength between the resin polymer and other metals.

Figure 2:
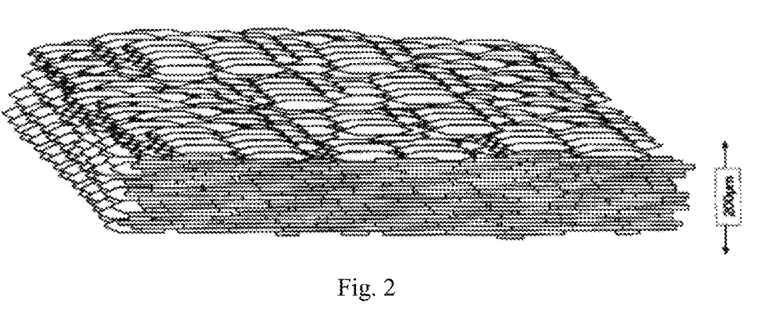
FIG. 2 shows the structure of the boron nitride agglomerate disclosed in CN103249695A.

CN103249695A discloses a boron nitride agglomerate, comprising lamellar hexagonal boron nitride primary particles that are agglomerated with one another with a preferred orientation, wherein the agglomerates formed are flake-shaped. The flake-shaped agglomerates are suitable as fillers for polymers for manufacturing polymer-boron nitride composites, as well as for hot pressing of boron nitride sintered compacts. As compared with the flake-shaped boron nitride in FIG. 1, such flake-shaped boron nitride agglomerates are accumulated more directionality, which will improve the dispersion, increase the addition amount, and improve the thermal conductivity to a certain extent. However, the boron nitride agglomerates have relatively large particle size; it is difficult to control the particle size of the agglomerates; and the improvement in peel strength is limited.

CN106255721A discloses a thermally conductive composite which contains a polymer and boron nitride, wherein the boron nitride is in the form of a nanofiber, a nanotube, a nanoplate or a combination thereof, or a thermally conductive composite which contains a boron nitride containing pores, and a polymer disposed in a pore of the boron nitride. CN102197069A discloses a heat conducting sheet containing plate-form boron nitride particles having an average particle diameter of more than 10 μm and less than 60 μm wherein the plate-form boron nitride particles are oriented to direct the major axis direction thereof along the thickness direction of the sheet. Although the composite materials disclosed above all have higher thermal conductivity, their improvement in peel strength is still insufficient.

In order to achieve higher addition amount, higher thermal conductivity and higher peel strength, it is desired to develop a novel boron nitride agglomerate having a thermal conductivity equivalent to boron nitride and higher peel strength.

SUMMARY

In view of the current problems, the object of the present invention is to provide a boron nitride agglomerate, a thermosetting resin composition containing the same, and uses thereof. Resin sheets, resin composite metal foils, prepregs, laminates, metal foil-clad laminates, and printed wiring boards prepared using a thermosetting resin composition into which the boron nitride agglomerate provided by the present invention has been added all have a higher addition amount of boron nitride, high thermal conductivity and high peel strength.

To achieve this goal, the following technical solutions are adopted in the present invention.

In a first aspect, the present invention provides a boron nitride agglomerate which is of a multi-stage structure formed by arranging flaky hexagonal boron nitride primary particles in three-dimensional directions through adhesion of an inorganic binder.

Preferably, the three-dimensional directions of the boron nitride agglomerate are mainly composed of any one or at least two of face-to-face connection, face-to-end connection or end-to-end connection manner of the flaky hexagonal boron nitride primary particles.

Preferably, the boron nitride agglomerate having a multi-stage structure is of a secondary structure or/and a tertiary structure, wherein a primary structure is the flaky hexagonal boron nitride primary particles; the secondary structure is a flower-like structure, staircase structure or arched structure composed of flaky hexagonal boron nitride primary particles radiating outward from the same center; the tertiary structure is a macro-agglomerate stacked by flower-like structure, staircase structure or arched structure.

In the boron nitride agglomerates described in the present invention, the secondary structure is a flower-like structure, a staircase structure or an arched structure composed of flaky hexagonal boron nitride primary particles radiating outward from the same center. The secondary structure is formed from many individual hexagonal boron nitride (hBN) platelets bonded by an inorganic binder phase.

The secondary structure which is a flower-like structure composed of flaky hexagonal boron nitride primary particles radiating outward from the same center means that the hexagonal boron nitride (hBN) platelets are connected in series using the inorganic binder phase as a central pillar, wherein the hexagonal boron nitride (hBN) platelets are not in contact with each other, and they are not arranged in parallel but are inclined at a certain angle, for example, an angle of 5 to 170 degrees between the hexagonal boron nitride (hBN) platelets, such that they appear to be a "flower-like structure" as a whole. Such flower-like structure mainly refers to the flower shape of Rosaceae plants, such as Chinese rose-like, rose-like, etc., and its "petals" can be a single layer or multiple layers, and the number of "petals" can be between 2 and 6.

The secondary structure which is a staircase structure composed of flaky hexagonal boron nitride primary particles means that a hexagonal boron nitride (hBN) platelet is divided into two parts, i.e. "head end" and "tail end", and the tail end of the first hexagonal boron nitride (hBN) platelet is overlapped with the head end of the second hexagonal boron nitride (hBN) platelet through an organic binder phase and then the head end of the third hexagonal boron nitride (hBN)

platelet is overlapped with the tail end of the second hexagonal boron nitride (hBN) platelet, and the aforementioned process is repeated to form a stair-like structure after several combinations.

The secondary structure which is an arched structure composed of flaky hexagonal boron nitride primary particles means that the hexagonal boron nitride (hBN) platelets are connected in series using the inorganic binder phase as the central pillar, wherein the hexagonal boron nitride (hBN) platelets are not in contact with each other, and they are not arranged in parallel but are inclined at a certain angle with the opening downward, such that they appear to be "arched" as a whole.

The boron nitride agglomerates described in the present invention are distinguished from non-aggregated flake-shaped boron nitride primary particles which are called "flaky boron nitride primary particles" in English literatures, and also distinguished from flake-shaped hexagonal boron nitride primary particles which are agglomerated with one another with a preferred orientation, or those which are oriented to direct the major axis direction thereof along the thickness direction of the sheet and present as a non-sheet or laminated structure as a whole as disclosed in the prior art.

Preferably, the boron nitride agglomerate having a multi-stage structure is of a tertiary structure.

Preferably, the flaky hexagonal boron nitride primary particle has a particle size of 0.5 μm to 200 μm, e.g. 0.5 μm, 1 μm, 5 μm, 10 μm, 12 μm, 15 μm, 20 μm, 30 μm, 40 μm, 50 μm, 60 μm, 70 μm, 80 μm, 90 μm, 100 μm, 120 μm, 150 μm, 180 μm, 190 μm or 200 μm, preferably 1 μm to 100 μm, further preferably 3 μm to 30 μm, more preferably 5 μm to 10 μm.

Preferably, the inorganic binder is in a mass of 0.02% to 20%, e.g. 0.02%, 0.05%, 0.1%, 0.5%, 1%, 2%, 3%, 4%, 5%, 8%, 10%, 12%, 15%, 16%, 18% or 20% of the mass of the flaky hexagonal boron nitride primary particles.

Preferably, the inorganic binder is an inorganic filler with a dielectric constant $D_k \leq 9.0$, e.g. 1, 2, 3, 4, 5, 6, 7, 8 or 9.

Preferably, the inorganic filler is any one or a mixture of at least two selected from the group consisting of silica, borosilicate glass, boron trioxide, bismuth oxide, hollow glass microspheres and ceramics. Typical but non-limiting mixtures are: silica and borosilicate glass; boron trioxide and bismuth oxide; hollow glass microspheres and ceramics.

In the second aspect, the present invention further provides a method for preparing the boron nitride agglomerate as stated in the first aspect. The method is: mixing flaky hexagonal boron nitride primary particles with an inorganic binder, and controlling the mass of the inorganic binder to account for 0.02-20% of the mass of the flaky hexagonal boron nitride primary particles, so as to obtain the boron nitride agglomerate having a multi-stage structure.

In the present invention, the boron nitride agglomerate as described in the first aspect are obtained by controlling the mass ratio of the inorganic binder to the flaky hexagonal boron nitride primary particles, i.e. controlling the mass of the inorganic binder to account for 0.02% to 20% of the mass of the flaky hexagonal boron nitride primary particles.

In the present invention, as the mass ratio of the inorganic binder increases, the flower-like structure in the multi-stage structure gradually decreases, and the arched and stair-like structures gradually increase.

When the inorganic binder is in a mass of less than 0.02% or more than 20% of the mass of the flaky hexagonal boron nitride primary particles, the boron nitride agglomerate structure of the present invention cannot be obtained.

In the present invention, the inorganic binder is in a mass of 0.02% to 20%, e.g. 0.02%, 0.05%, 0.1%, 0.5%, 1%, 2%, 3%, 4%, 5%, 8%, 10%, 12%, 15%, 16%, 18% or 20%, preferably 0.5%-10%, further preferably 1%-5%, of the mass of the flaky hexagonal boron nitride primary particles.

Preferably, the inorganic binder is an inorganic filler with a dielectric constant $D_k \leq 9.0$, e.g. 1, 2, 3, 4, 5, 6, 7, 8 or 9.

In the present invention, the dielectric constant $D_k$ can be measured using a IPC-2.5.5.9 plate capacitance method at a test frequency of 1 MHz.

Preferably, the inorganic filler is any one or a mixture of at least two selected from the group consisting of silica, borosilicate glass, boron trioxide, bismuth oxide and hollow glass microspheres. Typical but non-limiting mixtures are: silica and borosilicate glass; boron trioxide and bismuth oxide; hollow glass microspheres and silica.

In the third aspect, the present invention further provides a thermosetting resin composition comprising:
(A) a thermosetting resin;
(B) a boron nitride agglomerate as stated in the first aspect.

Preferably, the thermosetting resin is any one or a mixture of at least two selected from the group consisting of epoxy resin, polyphenylene ether resin, polybutadiene, polystyrene-butadiene block polymer, cyanate resin, bismaleimide-triazine resin, polytetrafluoroethylene, polyimide, multifunctional epoxy, liquid crystal epoxy and bismaleimide. Typical but non-limiting mixtures are: epoxy resin and polyphenylene ether resin; polybutadiene and polystyrene-butadiene block polymer; cyanate resin and bismaleimide-triazine resin.

Preferably, the thermosetting resin is in a mass of 5% to 85%, e.g. 5%, 8%, 10%, 12%, 15%, 20%, 22%, 25%, 31%, 38%, 40%, 42%, 45%, 50%, 55%, 60%, 68%, 70%, 75%, 80%, 82% or 85%, of the total mass of the thermosetting resin composition.

Preferably, the boron nitride agglomerate is in a mass of 5% to 90%, e.g. 5%, 8%, 10%, 12%, 15%, 20%, 22%, 25%, 31%, 38%, 40%, 42%, 45%, 50%, 55%, 60%, 68%, 70%, 75%, 80%, 82%, 85%, 88% or 90%, preferably 30% to 80%, further preferably 40% to 70%, of the total mass of the thermosetting resin composition.

Preferably, the thermosetting resin composition further comprises (C) a curing agent.

Preferably, the curing agent is any one or a mixture of at least two selected from the group consisting of aliphatic amines, alicyclic amines, aromatic amines, phenolic aldehydes, carboxylic acids, phenols, ethers, active esters and acid anhydrides. Typical but non-limiting mixtures are: aliphatic amines and alicyclic amines; aromatic amines and phenolics; active esters and anhydrides; phenolics, carboxylic acids and phenols.

Preferably, the curing agent is in a mass of 0.5% to 40%, e.g. 0.5%, 1%, 2%, 5%, 10%, 12%, 15%, 20%, 25%, 30%, 32%, 35% or 40%, of the total mass of the thermosetting resin composition.

Preferably, the thermosetting resin composition further comprises (D) an accelerator and/or (E) an initiator.

Preferably, the initiator is a free radical initiator.

Preferably, the accelerator is any one or a mixture of at least two selected from the group consisting of imidazole, phenols, pyridines, triphenylphosphine and organic metal salts. Typical but non-limiting mixtures are: imidazole and phenols; pyridines and triphenylphosphine; triphenylphosphine and organic metal salts.

Preferably, the organic metal salt is any one or a mixture of at least two selected from the group consisting of tin octoate, zinc octoate, zinc isooctanoate, tin isooctanoate, dibutyltin dilaurate and aluminum acetylacetonate coordination compound. Typical but non-limiting mixtures are: tin octoate and zinc octoate; zinc isooctanoate and tin isooctanoate; tin isooctanoate and dibutyltin dilaurate.

Preferably, the accelerator or initiator is in a mass of 0.01% to 5%, e.g. 0.01%, 0.02%, 0.03%, 0.05%, 0.1%, 0.5%, 1%, 2%, 3%, 4% or 5%, of the total mass of the thermosetting resin composition.

Preferably, the thermosetting resin composition further comprises (F) an additional filler.

Preferably, the additional filler is any one or a mixture of at least two selected from the group consisting of silica, fumed silica, calcium carbonate, titanium dioxide, kaolin, nano boron nitride, boron nitride fiber, alumina, magnesium oxide, aluminum hydroxide, magnesium hydroxide, talc, aluminum nitride, silicon carbide, boron trioxide, silicate and hollow glass microspheres. Typical but non-limiting mixtures are: silica and fumed silica; fumed silica and calcium carbonate; boron nitride fiber and alumina; magnesium oxide and aluminum hydroxide.

Preferably, the additional filler is in a mass of 0.5% to 70%, e.g. 0.5%, 0.8%, 0.9%, 1%, 1.5%, 2%, 5%, 10%, 12%, 15%, 18%, 20%, 25%, 30%, 35%, 40%, 45%, 50%, 55%, 60%, 65% or 70%, of the total mass of the thermosetting resin composition.

Preferably, the thermosetting resin composition further comprises (G) a flame retardant.

Preferably, the flame retardant is an additive organic flame retardant, and the organic flame retardant is preferably a phosphorus-containing and/or halogen-containing flame retardant.

Preferably, the flame retardant is in a mass of 1% to 40%, e.g. 1%, 2%, 5%, 6%, 8%, 10%, 11%, 13%, 15%, 18%, 20%, 25%, 30%, 35%, 38% or 40%, of the total mass of the thermosetting resin composition.

In the fourth aspect, the present invention further provides a prepreg comprising a reinforcing material and the thermosetting resin composition as stated in the third aspect attached thereon after impregnation and drying.

In the fifth aspect, the present invention further provides a laminate comprising at least one prepreg as stated in the fourth aspect.

In the sixth aspect, the present invention further provides a high-frequency circuit substrate comprising at least one prepreg as stated in the fourth aspect and a metal foil(s) coated on one or both sides of the superimposed prepreg(s).

As compared with the solutions in the prior art, the present invention has at least the following beneficial effects.

The present invention provides a thermosetting resin composition with high thermal conductivity, low dielectric constant, high peel strength and excellent drilling processability, and solves the problems of low thermal conductivity, high dielectric constant and low peel strength in traditional printed circuit boards.

The present invention will be described in further detail below. However, the following examples are only simple examples of the present invention and do not represent or limit the protection scope of the present invention. The protection scope of the present invention is subject to the claims.

DETAILED DESCRIPTION

The technical solutions of the present invention will be further described below with reference to the drawings and through specific implementations.

In order to better illustrate the present invention and facilitate understanding of the technical solutions of the present invention, the present invention provides the typical but non-limiting embodiments as follows.

Preparation Example 1

A method for preparing boron nitride agglomerates includes the following steps:

flaky hexagonal boron nitride primary particles were mixed with boron trioxide, wherein boron trioxide was in a mass of 5% of the flaky hexagonal boron nitride primary particles and the flaky hexagonal boron nitride primary particles had an average particle size of 10 μm, to obtain boron nitride agglomerate I.

Figure 3:
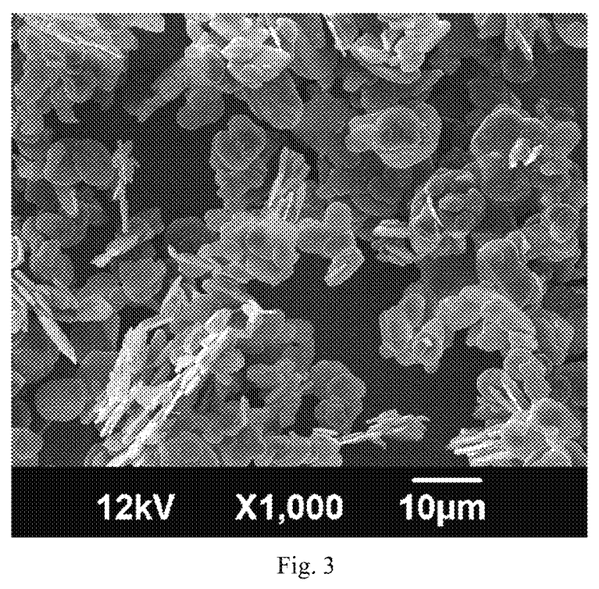
FIG. 3 shows a scanning electron microscope (SEM) image of a boron nitride agglomerate having a multi-stage structure (flower-like) prepared according to an embodiment of the present invention, with a magnification of 1,000.

As shown in FIG. 3 (FIG. 3 shows an SEM spectrum of the boron nitride agglomerates prepared in this example), the resulted product was a boron nitride agglomerate.

The resulted product had the morphology as shown in FIG. 3. It was formed by arranging flaky hexagonal boron nitride primary particles in three-dimensional directions, and contained a three-dimensional structure which was mainly in a flower shape and formed by radiating flaky hexagonal boron nitride primary particles outward from the same center.

Preparation Example 2

As compared with Preparation Example 1, the mass of boron trioxide was controlled to be 1% of the mass of the flaky hexagonal boron nitride primary particles, to obtain boron nitride agglomerate II.

The resulted product was formed by arranging flaky hexagonal boron nitride primary particles in three-dimensional directions, and contained a three-dimensional structure which was mainly in a flower shape and formed by radiating flaky hexagonal boron nitride primary particles outward from the same center.

Preparation Example 3

As compared with Preparation Example 1, the mass of boron trioxide was controlled to be 10% of the mass of the flaky hexagonal boron nitride primary particles, and the average particle size of the flaky hexagonal boron nitride primary particles was 50 μm, to obtain boron nitride agglomerate III.

Figure 4:
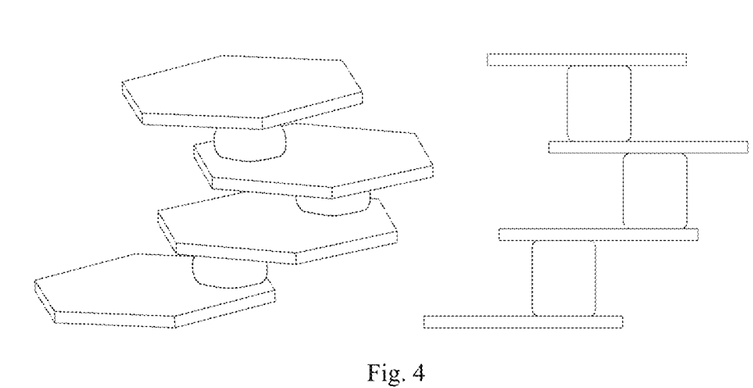
FIG. 4 shows a schematic diagram of a boron nitride agglomerate having a multi-stage structure (stair-like) prepared according to an embodiment of the present invention.

The resulted product was formed by arranging flaky hexagonal boron nitride primary particles in three-dimensional directions, and contained a three-dimensional structure which was mainly in a staircase shape and formed by radiating flaky hexagonal boron nitride primary particles outward from the same center (as shown in FIG. 4).

Preparation Example 4

As compared with Preparation Example 1, the mass of boron trioxide was controlled to be 15% of the mass of the flaky hexagonal boron nitride primary particles, and the average particle size of the flaky hexagonal boron nitride primary particles was 5 μm, to obtain boron nitride agglomerate IV.

The resulted product was formed by arranging flaky hexagonal boron nitride primary particles in three-dimensional directions, and contained a three-dimensional structure which was mainly in an arch shape and formed by radiating flaky hexagonal boron nitride primary particles outward from the same center.

Preparation Example 5

As compared with Preparation Example 1, boron trioxide was replaced with a mixture of silica and borosilicate glass, wherein the silica was in a mass of 5% of the mass of the flaky hexagonal boron nitride primary particles and the borosilicate glass was in a mass of 15% of the mass of the flaky hexagonal boron nitride primary particles, to obtain boron nitride agglomerate V.

The resulted product was formed by arranging flaky hexagonal boron nitride primary particles in three-dimensional directions, and contained a three-dimensional structure which was mainly in a staircase shape and formed by radiating flaky hexagonal boron nitride primary particles outward from the same center.

Preparation Example 6

As compared with Preparation Example 1, boron trioxide was replaced with silica, i.e. the mass of silica was controlled to be 5% of the mass of the flaky hexagonal boron nitride primary particles, to obtain boron nitride agglomerate VI.

The resulted product was formed by arranging flaky hexagonal boron nitride primary particles in three-dimensional directions, and contained a three-dimensional structure which was mainly in a flower shape and formed by radiating flaky hexagonal boron nitride primary particles outward from the same center.

Preparation Example 7

As compared with Preparation Example 1, boron trioxide was replaced with bismuth oxide and hollow glass microspheres, wherein the bismuth oxide was in a mass of 3% of the mass of the flaky hexagonal boron nitride primary particles and the hollow glass microspheres were in a mass of 16% of the mass of the flaky hexagonal boron nitride primary particles, to obtain boron nitride agglomerate VII.

The resulted product was formed by arranging flaky hexagonal boron nitride primary particles in three-dimensional directions, and contained a three-dimensional structure which was mainly in a staircase shape and formed by radiating flaky hexagonal boron nitride primary particles outward from the same center.

Comparative Preparation Example 1

As compared with Preparation Example 1, no binder was added and flaky boron nitride was obtained.

Comparative Preparation Example 2

As compared with Preparation Example 1, the mass of boron trioxide was controlled to be 0.01% of the mass of flaky hexagonal boron nitride primary particles. The others were the same as those in Preparation Example 1.

The resulted product was an irregular flocculent agglomerate with a shape similar to the structure in FIG. 1.

Comparative Preparation Example 3

As compared with Preparation Example 1, the mass of boron trioxide was controlled to be 21% of the mass of flaky hexagonal boron nitride primary particles. The others were the same as those in Preparation Example 1.

The resulted product was dominated by a layered structure supported by boron trioxide as a binder.

Comparative Preparation Example 4

As compared with Preparation Example 1, boron trioxide was replaced with calcium carbonate. Others were the same as Preparation Example 1.

Comparative Preparation Example 5

As Compared with Preparation Example 1, boron trioxide was replaced with titanium dioxide. Others were the same as Preparation Example 1.

The obtained product was similar to that in Preparation Example 1 in the shape. But, because of its very high $D_k$, it could not be used in the low dielectric field.

The following examples and comparative examples are thermosetting resin compositions containing the above boron nitride agglomerates.

Example 1

21 parts of SA9000 polyphenylene ether, 5 parts of styrene-butadiene block copolymer, 50 parts of boron nitride agglomerate I prepared in Preparation Example 1, 3 parts of silica, 3 parts of dicumyl peroxide, and 18 parts of decabromodiphenylethane were dissolved in toluene to prepare a glue solution having an appropriate viscosity. 2116 electronic grade glass cloth was impregnated in such glue solution. Then the solvent was removed in an oven at 115° C. to obtain a B-stage prepreg sample with a resin content of 54%. The sum of the parts by weight of the SA9000, styrene-butadiene block copolymer, boron nitride agglomerates, silica, dicumyl peroxide and decabromodiphenylethane was 100 parts.

Eight sheets of the above prepared prepregs and two sheets of one-ounce electrolytic copper foil were superimposed together and laminated by a hot press to obtain a double-sided copper-clad laminate under the lamination conditions of: 1. the heating rate controlled at 0.5° C.-4.0° C./min when the prepregs were at 80° C.-120° C.; 2. the pressure designed to be 20 kg/cm²; and 3. the curing temperature of 190° C. which was maintained for 90 minutes. The obtained double-sided copper-clad laminate was tested for performance, and the corresponding performance is shown in Table 1.

Example 2

23 parts of SA9000 polyphenylene ether, 8 parts of styrene-butadiene block copolymer, 45 parts of boron nitride agglomerate II prepared in Preparation Example 2, 3 parts of silica, 3 parts of dicumyl peroxide, and 18 parts of decabromodiphenylethane were dissolved in toluene to prepare a glue solution having an appropriate viscosity. 2116 electronic grade glass cloth was impregnated in such glue solution. Then the solvent was removed in an oven at 115° C. to obtain a B-stage prepreg sample with a resin content of 54%. The sum of the parts by weight of the SA9000, styrene-butadiene block copolymer, boron nitride agglomerates, silica, dicumyl peroxide and decabromodiphenylethane was 100 parts.

Eight sheets of the above prepared prepregs and two sheets of one-ounce electrolytic copper foil were superimposed together and laminated by a hot press to obtain a double-sided copper-clad laminate under the lamination conditions of: 1. the heating rate controlled at 0.5° C.-4.0° C./min when the prepregs were at 80° C.-120° C.; 2. the pressure designed to be 20 kg/cm$^2$; and 3. the curing temperature of 190° C. which was maintained for 90 minutes. The obtained double-sided copper-clad laminate was tested for performance, and the corresponding performance is shown in Table 1.

Example 3

15 parts of SA9000 polyphenylene ether, 3 parts of styrene-butadiene block copolymer, 53 parts of boron nitride agglomerate III prepared in Preparation Example 3, 3 parts of silica, 3 parts of dicumyl peroxide, and 23 parts of SPB100 were dissolved in toluene to prepare a glue solution having an appropriate viscosity. 2116 electronic grade glass cloth was impregnated in such glue solution. Then the solvent was removed in an oven at 115° C. to obtain a B-stage prepreg sample with a resin content of 54%. The sum of the parts by weight of the SA9000, styrene-butadiene block copolymer, boron nitride agglomerates, silica, dicumyl peroxide and SPB100 was 100 parts.

Eight sheets of the above prepared prepregs and two sheets of one-ounce electrolytic copper foil were superimposed together and laminated by a hot press to obtain a double-sided copper-clad laminate under the lamination conditions of: 1. the heating rate controlled at 0.5° C.-4.0° C./min when the prepregs were at 80° C.-120° C.; 2. the pressure designed to be 20 kg/cm$^2$; and 3. the curing temperature of 190° C. which was maintained for 90 minutes. The obtained double-sided copper-clad laminate was tested for performance, and the corresponding performance is shown in Table 1.

Example 4

40 parts of EPIKOTE828EL, 37.7 parts of boron nitride agglomerate IV prepared in Preparation Example 4, 3 parts of silica, 4.26 parts of dicyandiamide, 0.04 part of 2-methylimidazole and 15 parts of decabromodiphenylethane were dissolved in N,N-dimethylformamide to prepare a glue solution having an appropriate viscosity. 2116 electronic grade glass cloth was impregnated in such glue solution. Then the solvent was removed in an oven at 115° C. to obtain a B-stage prepreg sample with a resin content of 54%. The sum of the parts by weight of the EPIKOTE828EL, boron nitride agglomerates, silica, dicyandiamide, 2-methylimidazole and decabromodiphenylethane was 100 parts.

Eight sheets of the above prepared prepregs and two sheets of one-ounce electrolytic copper foil were superimposed together and laminated by a hot press to obtain a double-sided copper-clad laminate under the lamination conditions of: 1. the heating rate controlled at 0.5° C.-4.0° C./min when the prepregs were at 80° C.-120° C.; 2. the pressure designed to be 20 kg/cm$^2$; and 3. the curing temperature of 190° C. which was maintained for 90 minutes. The obtained double-sided copper-clad laminate was tested for performance, and the corresponding performance is shown in Table 1.

Comparative Example 1

21 parts of SA9000 polyphenylene ether, 5 parts of styrene-butadiene block copolymer, 50 parts of the flaky boron nitride agglomerate prepared in Comparative Preparation Example 1, 3 parts of silica, 3 parts of dicumyl peroxide, and 18 parts of decabromodiphenylethane were dissolved in toluene to prepare a glue solution having an appropriate viscosity. 2116 electronic grade glass cloth was impregnated in such glue solution. Then the solvent was removed in an oven at 115° C. to obtain a B-stage prepreg sample with a resin content of 54%. The sum of the parts by weight of the SA9000, styrene-butadiene block copolymer, flaky boron nitride agglomerates, silica, dicumyl peroxide and decabromodiphenylethane was 100 parts.

Eight sheets of the above prepared prepregs and two sheets of one-ounce electrolytic copper foil were superimposed together and laminated by a hot press to obtain a double-sided copper-clad laminate under the lamination conditions of: 1. the heating rate controlled at 0.5° C.-4.0° C./min when the prepregs were at 80° C.-120° C.; 2. the pressure designed to be 20 kg/cm$^2$; and 3. the curing temperature of 190° C. which was maintained for 90 minutes. The obtained double-sided copper-clad laminate was tested for performance, and the corresponding performance is shown in Table 1.

Comparative Example 2

23 parts of SA9000 polyphenylene ether, 8 parts of styrene-butadiene block copolymer, 45 parts of the flaky boron nitride prepared in Comparative Preparation Example 1, 3 parts of silica, 3 parts of dicumyl peroxide, and 18 parts of decabromodiphenylethane were dissolved in toluene to prepare a glue solution having an appropriate viscosity. 2116 electronic grade glass cloth was impregnated in such glue solution. Then the solvent was removed in an oven at 115° C. to obtain a B-stage prepreg sample with a resin content of 54%. The sum of the parts by weight of the SA9000, styrene-butadiene block copolymer, flaky boron nitride agglomerates, silica, dicumyl peroxide and decabromodiphenylethane was 100 parts.

Eight sheets of the above prepared prepregs and two sheets of one-ounce electrolytic copper foil were superimposed together and laminated by a hot press to obtain a double-sided copper-clad laminate under the lamination conditions of: 1. the heating rate controlled at 0.5° C.-4.0° C./min when the prepregs were at 80° C.-120° C.; 2. the pressure designed to be 20 kg/cm$^2$; and 3. the curing temperature of 190° C. which was maintained for 90 minutes. The obtained double-sided copper-clad laminate was tested for performance, and the corresponding performance is shown in Table 1.

Comparative Example 3

15 parts of SA9000 polyphenylene ether, 3 parts of styrene-butadiene block copolymer, 53 parts of the flaky boron nitride prepared in Comparative Preparation Example 1, 3 parts of silica, 3 parts of dicumyl peroxide, and 23 parts of SPB100 were dissolved in toluene to prepare a glue solution having an appropriate viscosity. 2116 electronic grade glass cloth was impregnated in such glue solution. Then the solvent was removed in an oven at 115° C. to obtain a B-stage prepreg sample with a resin content of 54%. The sum of the parts by weight of the SA9000, styrene-butadiene block copolymer, flaky boron nitride agglomerates, silica, dicumyl peroxide and SPB100 was 100 parts.

Eight sheets of the above prepared prepregs and two sheets of one-ounce electrolytic copper foil were superimposed together and laminated by a hot press to obtain a double-sided copper-clad laminate under the lamination conditions of: 1. the heating rate controlled at 0.5° C.-4.0° C./min when the prepregs were at 80° C.-120° C.; 2. the pressure designed to be 20 kg/cm²; and 3. the curing temperature of 190° C. which was maintained for 90 minutes. The obtained double-sided copper-clad laminate was tested for performance, and the corresponding performance is shown in Table 1.

Comparative Example 4

40 parts of EPIKOTE828EL, 37.7 parts of the flaky boron nitride agglomerate prepared in Comparative Preparation Example 1, 3 parts of silica, 4.26 parts of dicyandiamide, 0.04 part of 2-methylimidazole and 15 parts of decabromodiphenylethane were dissolved in N,N-dimethylformamide to prepare a glue solution having an appropriate viscosity. 2116 electronic grade glass cloth was impregnated in such glue solution. Then the solvent was removed in an oven at 115° C. to obtain a B-stage prepreg sample with a resin content of 54%. The sum of the parts by weight of the EPIKOTE828EL, boron nitride agglomerates, silica, dicyandiamide, 2-methylimidazole and decabromodiphenylethane was 100 parts.

Eight sheets of the above prepared prepregs and two sheets of one-ounce electrolytic copper foil were superimposed together and laminated by a hot press to obtain a double-sided copper-clad laminate under the lamination conditions of: 1. the heating rate controlled at 0.5° C.-4.0° C./min when the prepregs were at 80° C.-120° C.; 2. the pressure designed to be 20 kg/cm²; and 3. the curing temperature of 190° C. which was maintained for 90 minutes. The obtained double-sided copper-clad laminate was tested for performance, and the corresponding performance is shown in Table 1.

Comparative Example 5

As compared with Example 1, boron nitride agglomerate I was replaced with the boron nitride agglomerate prepared in Preparation Example 2.

Comparative Example 6

As compared with Example 1, boron nitride agglomerate I was replaced with the boron nitride agglomerate prepared in Preparation Example 3.

Comparative Example 7

As compared with Example 1, boron nitride agglomerate I was replaced with the boron nitride agglomerate prepared in Preparation Example 4.

Comparative Example 8

As compared with Example 1, boron nitride agglomerate I was replaced with the boron nitride agglomerate prepared in Preparation Example 5.

Comparative Example 9

As compared with Example 1, boron nitride agglomerate I was replaced with the boron nitride agglomerate in CN103249695A.

Comparative Example 10

As compared with Example 1, boron nitride agglomerate I was replaced with the boron nitride agglomerate in CN106255721A.

TABLE 1

Performance test results of copper-clad laminates obtained from thermosetting resin compositions

| | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|---|---|
| SA9000 | 21 | 23 | 15 | | 21 | 23 | 15 | | 21 | 21 | 21 | 21 | 21 | 21 |
| EPIKOTE828EL | | | | 40 | | | | 40 | | | | | | |
| Styrene-butadiene block copolymer | 5 | 8 | 3 | | 5 | 8 | 3 | | 5 | 5 | 5 | 5 | 5 | 5 |
| Boron nitride agglomerate I | 50 | | | | | | | | | | | | | |
| Boron nitride agglomerate II | | 45 | | | | | | | | | | | | |
| Boron nitride agglomerate III | | | 53 | | | | | | | | | | | |
| Boron nitride agglomerate IV | | | | 37.7 | | | | | | | | | | |

TABLE 1-continued

Performance test results of copper-clad laminates obtained from thermosetting resin compositions

| | Example 1 | Example 2 | Example 3 | Example 4 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|---|---|
| Flaky boron nitride | | | | | 50 | 45 | 53 | 37.7 | | | | | | |
| Comparative boron nitride agglomerate | | | | | | | | | $50^2$ | $50^3$ | $50^4$ | $50^5$ | $50^6$ | $50^7$ |
| Silica | 3 | 3 | 3 | 3 | 3 | 3 | 3 | 3 | 3 | 3 | 3 | 3 | 3 | 3 |
| Dicumyl peroxide | 3 | 3 | 3 | | 3 | 3 | 3 | | 3 | 3 | 3 | 3 | 3 | 3 |
| Dicyandiamide | | | | 4.26 | | | | 4.26 | | | | | | |
| 2-methyl-imidazole | | | | 0.04 | | | | 0.04 | | | | | | |
| Decabromo-diphenylethane | 18 | 18 | | 15 | 18 | 18 | | 15 | 18 | 18 | 18 | 18 | 18 | 18 |
| SPB100 | | | 23 | | | | 23 | | | | | | | |
| N,N-dimethyl-formamide | | | | q.s. | | | | q.s. | | | | | | |
| Toluene | q.s. | q.s. | q.s. | | q.s. | q.s. | q.s. | | q.s. | q.s. | q.s. | q.s. | q.s. | q.s. |
| $D_k$ (10 GHz) | 3.83 | 3.75 | 3.91 | 4.37 | 3.92 | 3.83 | 4.02 | 4.35 | 3.87 | 3.72 | 5.68 | 6.98 | 3.76 | 3.72 |
| Peel strength (N/mm) | 1.16 | 1.21 | 1.09 | 1.32 | 0.87 | 0.92 | 0.79 | 1.01 | 0.76 | 1.25 | 1.08 | 1.10 | 0.75 | 0.67 |
| Thermal conductivity of insulating layer (w/(m·k)) | 1.48 | 1.33 | 1.52 | 1.01 | 1.03 | 0.86 | 1.18 | 0.97 | 1.12 | 1.02 | 0.98 | 1.14 | 1.36 | 1.09 |

The superscripts 2, 3, 4, 5, 6, and 7 used in the row of "Comparative boron nitride agglomerate" in the table represent boron nitride agglomerates prepared in Comparative Examples 5, 6, 7, 8, 9, and 10, respectively.

The above performance test methods are as follows:

(1) Dielectric constant (Dk), dielectric loss (Df): measured by using the IPC-TM-650 2.5.5.9 method;

(2) Peel strength: measured in accordance with the "post-stress" treatment conditions specified in IPC-TM-650 2.4.8;

(3) Method for testing thermal conductivity of an insulating layer: tested in accordance with ASTM D5470 standard.

The following points can be seen from Table 1.

(1) By comparing Example 1 with Comparative Example 1, it can be seen that the laminate prepared in Example 1 has the $D_k$ value of 3.83 which is lower than the $D_k$ value in Comparative Example 1 (3.92), the thermal conductivity of the insulating layer of 1.48 w/(m·k) which is higher than that in Comparative Example 1 (1.03 w/(m·k)), and the peel strength of 1.16 N/mm which is higher than that in Comparative Example 1 (0.87 N/mm). The same conclusion can be obtained by comparing Examples 2-4 with Comparative Examples 2-4.

It can be seen therefrom that the resin composition containing the boron nitride agglomerates prepared by the present invention, compared to the resin composition containing flaky boron nitride without an added binder, can make the laminates have more excellent dielectric properties (lower $D_k$ value), better thermal conductivity (higher thermal conductivity of insulating layer) and higher peel strength level between insulating layer and copper foil.

(2) By comparing Example 1 with Comparative Example 5, it can be seen that the laminate prepared in Example 1 has the $D_k$ value of 3.83 which is lower than the $D_k$ value in Comparative Example 5 (3.87), the thermal conductivity of the insulating layer of 1.48 w/(m·k) which is higher than that in Comparative Example 5 (1.12 w/(m·k)), and the peel strength of 1.16 N/mm which is higher than that in Comparative Example 5 (0.76 N/mm).

It can be seen by comparing Example 1 with Comparative Example 6 that, although the laminate made in Comparative Example 6 has a lower $D_k$ value and higher peel strength, its thermal conductivity of the insulating layer is much lower than that in Example 1.

It can be seen therefrom that the resin composition containing the boron nitride agglomerates prepared by the present invention, compared to the resin composition containing a boron nitride agglomerate prepared by using a binder in a mass that is not within the scope of the present invention, can make the laminates have better overall performance, including more excellent dielectric properties (lower $D_k$ value), better thermal conductivity (higher thermal conductivity of insulating layer) and higher peel strength between insulating layer and copper foil.

(3) It can be seen by comparing Example 1 with Comparative Example 7 that the laminate prepared in Example 1 has the $D_k$ value of 3.83 which is much lower than the $D_k$ value in Comparative Example 7 (5.68), the thermal conductivity of the insulating layer of 1.48 w/(m·k) which is higher than that in Comparative Example 7 (0.98 w/(m·k)), and the peel strength of 1.16 N/mm which is higher than that in Comparative Example 7 (1.08 N/mm). The same conclusion can be obtained by comparing Example 1 with Comparative Example 8.

It can be seen therefrom that the resin composition containing the boron nitride agglomerates prepared by the present invention, compared to the resin composition containing a boron nitride agglomerate prepared by using a binder type that is not within the scope of the present invention, can make the laminates have better overall performance, including more excellent dielectric properties (lower $D_k$ value), better thermal conductivity (higher thermal conductivity of insulating layer) and higher peel strength between insulating layer and copper foil.

(4) By comparing Example 1 with Comparative Example 9, it can be seen that Comparative Example 9 is inferior to Example 1 in thermal conductivity of the insulating layer and peel strength although it has a lower $D_k$ value. The same conclusion can be obtained by comparing Example 1 with Comparative Example 10.

It can be seen therefrom that the resin composition containing the boron nitride agglomerates prepared by the present invention, compared to resin compositions containing the boron nitride agglomerates disclosed in CN103249695A and CN106255721A, can make the laminates have better overall performance, especially better thermal conductivity (higher thermal conductivity of insulating layer) and higher peel strength between insulating layer and copper foil.

From the test results of the examples and Comparative examples in the above table, it can be concluded that the resin composition containing boron nitride agglomerates according to the present invention can provide laminates with more excellent dielectric properties (lower $D_k$ value), better thermal conductivity (higher thermal conductivity of the insulating layer), higher peel strength level between the insulating layer and copper foil, and relatively excellent overall performance of the board for customers.

Certainly, the above-mentioned embodiments are only preferred examples of the present invention and are not intended to limit the scope of implementation of the present invention. Therefore, any equivalent changes or modifications made according to the structure, features and principles described in the scope of the patent application are included in the scope of the patent application of the present invention.

Since the thermosetting composition with high thermal conductivity and low dielectric constant provided by the present invention can also effectively control the thickness of the copper clad laminate under mild conditions, it is of great significance in terms of production and economic effects.

The applicant claims that the detailed structural features the present invention are described by the above embodiments. However, the present invention is not limited to the detailed structural features above, i.e. it does not mean that the present invention cannot be carried out unless the above embodiments are applied. Those skilled in the art shall know that any modifications of the present invention, equivalent substitutions of the materials selected for use in the present invention, and addition of the auxiliary ingredients, and specific manner in which they are selected, all are within the protection scope and disclosure of the present invention.

The invention claimed is:

1. A boron nitride agglomerate, which is of a multi-stage structure formed by arranging flaky hexagonal boron nitride primary particles in three-dimensional directions through adhesion of an inorganic binder;
wherein the boron nitride agglomerate having a multi-stage structure is of a secondary structure or/and a tertiary structure, wherein the secondary structure is a flower-like structure, staircase structure or arched structure composed of flaky hexagonal boron nitride primary particles radiating outward from the same center; the tertiary structure is a macro-agglomerate stacked by flower-like structure, staircase structure or arched structure.

2. The boron nitride agglomerate according to claim 1, wherein the three-dimensional directions of the boron nitride agglomerate are mainly composed of any one or at least two of face-to-face connection, face-to-end connection or end-to-end connection manner of the flaky hexagonal boron nitride primary particles.

3. The boron nitride agglomerate according to claim 1, wherein the boron nitride agglomerate having a multi-stage structure is of a tertiary structure.

4. The boron nitride agglomerate according to claim 1, wherein the flaky hexagonal boron nitride primary particle has a particle size of 0.5 μm to 200 μm.

5. The boron nitride agglomerate according to claim 1, wherein the inorganic binder is in a mass of 0.02% to 20% of the mass of the flaky hexagonal boron nitride primary particles.

6. The boron nitride agglomerate according to claim 1, wherein the inorganic binder is an inorganic filler with a dielectric constant $D_k \leq 9.0$.

7. The boron nitride agglomerate according to claim 6, wherein the inorganic filler is any one or a mixture of at least two selected from the group consisting of silica, borosilicate glass, boron trioxide, bismuth oxide, hollow glass microspheres and ceramics.

8. A thermosetting resin composition, comprising:
(A) a thermosetting resin;
(B) a boron nitride agglomerate according to claim 1.

9. The thermosetting resin composition according to claim 8, wherein the thermosetting resin is any one or a mixture of at least two selected from the group consisting of epoxy resin, polyphenylene ether resin, polybutadiene, polystyrene-butadiene block polymer, cyanate resin, bismaleimide-triazine resin, polytetrafluoroethylene, polyimide, multifunctional epoxy, liquid crystal epoxy and bismaleimide.

10. The thermosetting resin composition according to claim 8, wherein the thermosetting resin is in a mass of 5% to 85% of the total mass of the thermosetting resin composition.

11. The thermosetting resin composition according to claim 8, wherein the boron nitride agglomerate is in a mass of 5% to 90%.

12. The thermosetting resin composition according to claim 8, wherein the thermosetting resin composition further comprises (C) a curing agent.

13. The thermosetting resin composition according to claim 8, wherein the thermosetting resin composition further comprises (D) an accelerator and/or (E) an initiator.

14. The thermosetting resin composition according to claim 8, wherein the thermosetting resin composition further comprises (F) a filler.

15. The thermosetting resin composition according to claim 8, wherein the thermosetting resin composition further comprises (G) a flame retardant.

16. A laminate, comprising at least one prepreg, wherein the prepreg comprises a reinforcing material and the thermosetting resin composition according to claim 8 attached thereon after impregnation and drying.

17. A method for preparing the boron nitride agglomerate according to claim 1, which is: mixing flaky hexagonal boron nitride primary particles with an inorganic binder, and controlling the mass of the inorganic binder to account for 0.02-20% of the mass of the flaky hexagonal boron nitride primary particles, so as to obtain the boron nitride agglomerate having a multi-stage structure.

18. The method according to claim 17, wherein the inorganic binder is an inorganic filler with a dielectric constant $D_k \leq 9.0$.

19. The method according to claim 18, wherein the inorganic filler is any one or a mixture of at least two selected from the group consisting of silica, borosilicate glass, boron trioxide, bismuth oxide and hollow glass microspheres.

\* \* \* \* \*